United States Patent [19]

van Remmen

[11] 4,167,137
[45] Sep. 11, 1979

[54] METHOD AND APPARATUS FOR FRYING THIN POTATO SLICES TO CHIPS

[75] Inventor: Hendrikus H. J. van Remmen, Zetten, Netherlands

[73] Assignee: Instituut Voor Bewaring en Verwerking Van Landouwprodukten, Wageningen, Netherlands

[21] Appl. No.: 770,775

[22] Filed: Feb. 22, 1977

[30] Foreign Application Priority Data

Feb. 24, 1976 [NL] Netherlands .......................... 7601876

[51] Int. Cl.² ............................................. A47J 37/12
[52] U.S. Cl. ......................................... 99/352; 99/404
[58] Field of Search ................. 99/352, 353, 355, 404, 99/405, 406, , 407, 408, 487, 339, 401, 447; 34/78, 60, 68, 197, 212, 213; 126/275

[56] References Cited

U.S. PATENT DOCUMENTS

| 2,678,599 | 5/1954 | Maddocks | 99/405 |
|---|---|---|---|
| 2,833,203 | 5/1958 | Benson et al. | 99/404 |
| 2,902,921 | 9/1959 | Brodrick | 99/352 |
| 3,209,678 | 10/1965 | Benson et al. | 99/406 |
| 3,282,197 | 11/1966 | Smith, Jr. | 99/407 X |
| 3,294,554 | 12/1966 | Osborne et al. | 99/352 UX |
| 3,295,434 | 1/1967 | Wilhelm et al. | 99/346 |
| 3,592,668 | 7/1971 | Denk | 99/330 |
| 3,682,643 | 8/1972 | Foster | 99/352 X |
| 3,812,775 | 5/1974 | Sijbring | 99/404 |
| 3,815,489 | 6/1974 | Reid, Jr. et al. | 99/339 |
| 3,869,971 | 3/1975 | Driscoll | 99/404 X |
| 3,931,683 | 1/1976 | Crites et al. | 34/78 X |
| 4,070,765 | 1/1978 | Hovmand et al. | 34/60 X |
| 4,077,133 | 3/1978 | Loken | 34/60 X |

Primary Examiner—Harvey C. Hornsby
Assistant Examiner—Arthur O. Henderson
Attorney, Agent, or Firm—Hopgood, Calimafde, Kalil, Blaustein & Lieberman

[57] ABSTRACT

Thin potato slices are fried to chips in a two-stage operation. In the first stage the slices are fried in oil to a moisture content of 3–10% by weight. This product is removed from the oil and the moisture content is reduced to 1.5–2.5% by weight in a second stage by the supply of heat. To reduce the moisture content in the second stage at least a portion of the frying vapors substantially without false air and having a temperature of at least 120° C., is guided from the space above the oil of the first stage to the slices removed from the oil.

A suitable apparatus for frying thin potato slices to chips comprises an oil vessel, means to control the displacement of the slices from one end of the vessel to the opposite end, an inclined conveyor to remove the slices from the oil, a hood, at least one exhaust channel for the frying vapors and a drying device to reduce the moisture content of the slices to the desired final value, said drying device having at least one conveyor provided with openings, the space at one side of the conveyor being in connection with a flowing channel for at least a portion of the frying vapors formed above the oil and the space at the other side of said conveyor being in connection with an exhaust channel for said frying vapors.

3 Claims, 5 Drawing Figures

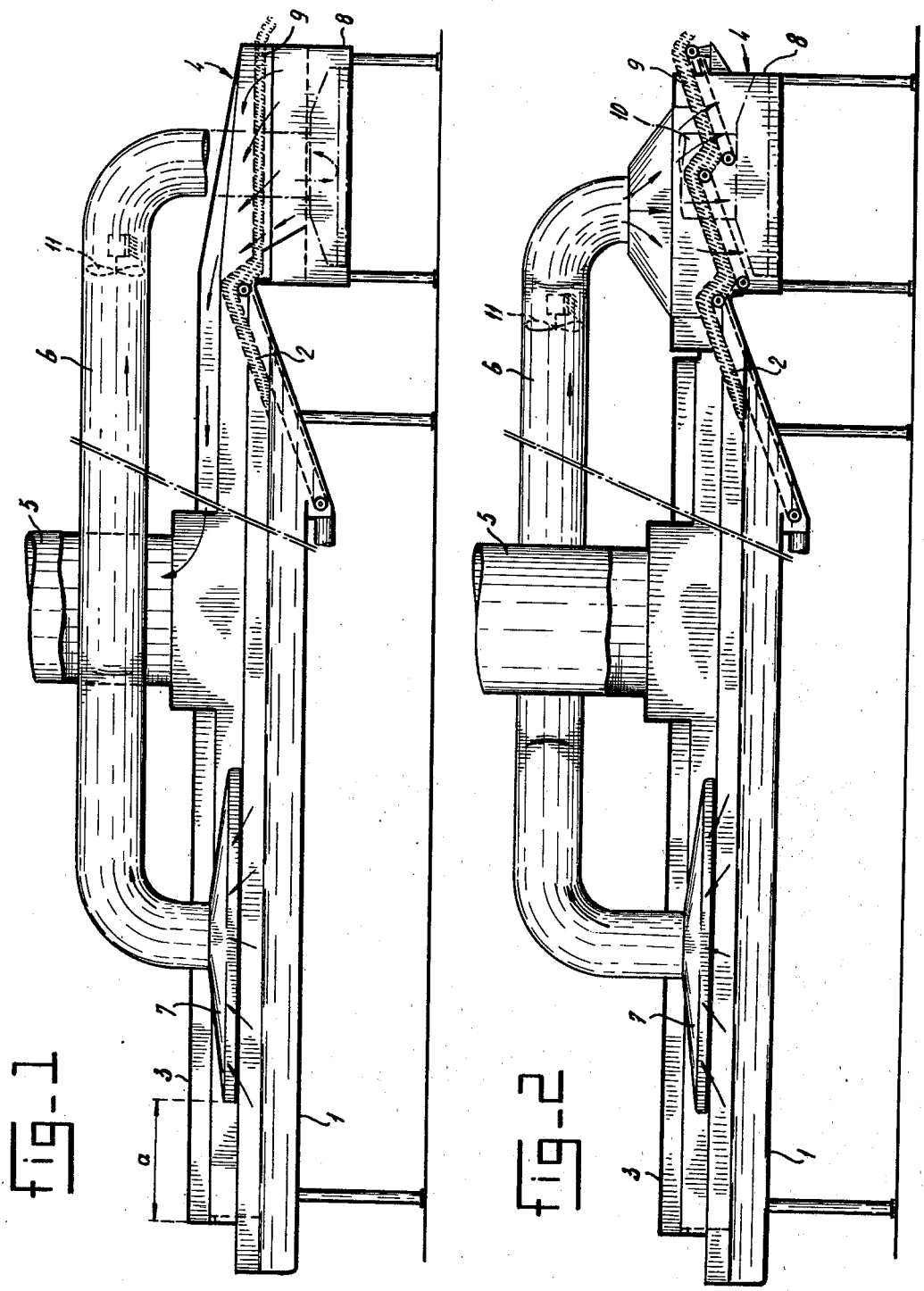

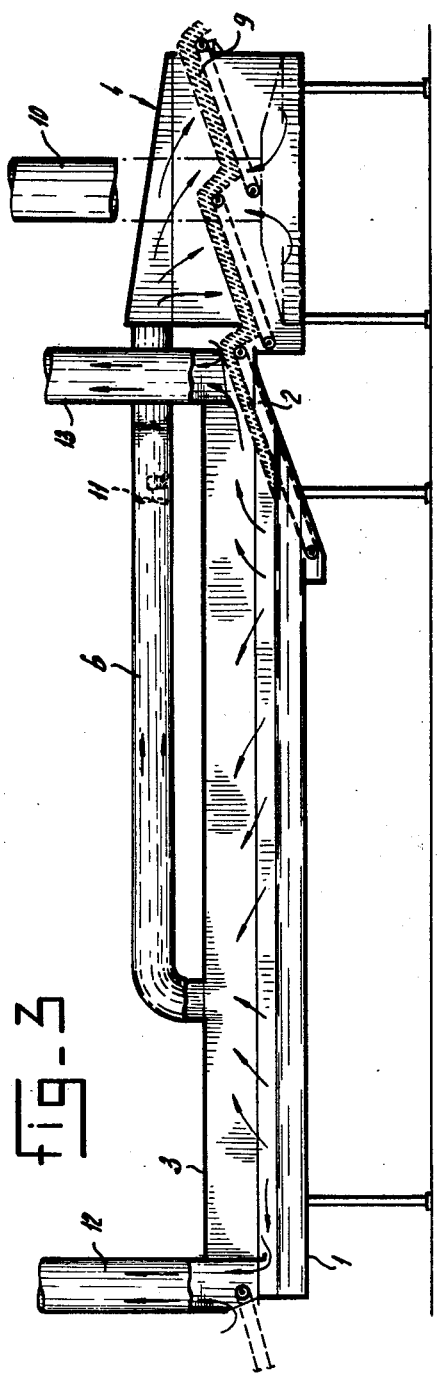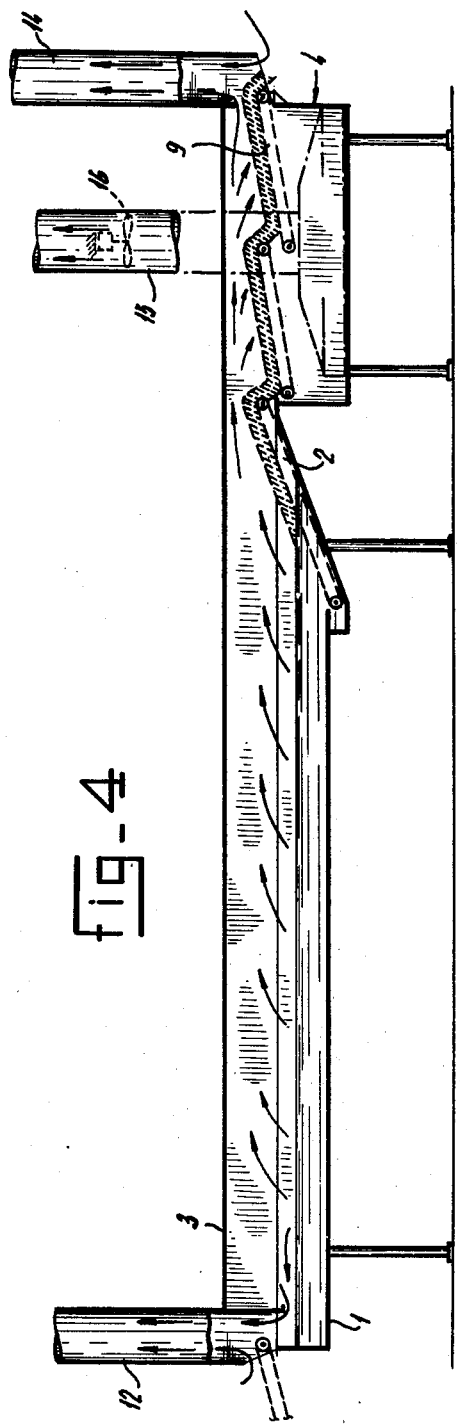

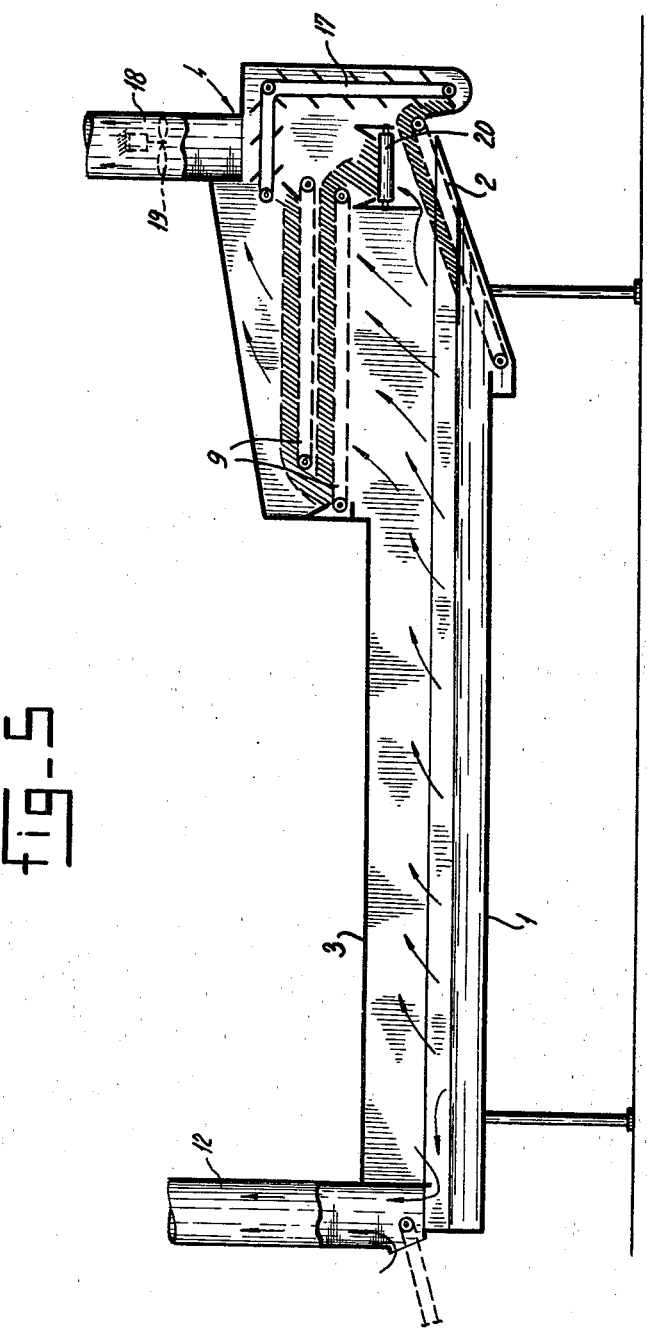

METHOD AND APPARATUS FOR FRYING THIN POTATO SLICES TO CHIPS

BACKGROUND OF THE INVENTION

Chips fried in the usual way have a rather high oil content. This means a disadvantage for the producer as well as for the consumer. The producer has to replenish the oil losses which will increase the price. The consumer has to eat a product having a rather high fat content which is undesirable.

To reduce the oil content of the chips it is known to fry the slices in a first stage in hot oil to a moisture content of 3-10% by weight, to remove this product from the oil and to reduce the moisture content in a second stage to 1.5-2.5% by the additional supply of heat. Hot air and a high frequent heating method are used to get this additional heat. This will lead to a low viscosity of the adhering oil which therefor will drip off from the chips more easily. Besides the adhering oil cannot penetrate into the pores of the chips since moisture is still evaporating. An important disadvantage of the known method is the additional energy necessary to get the additional heat. Further the supply of hot air will lead to the oxidation of the oil so that the chips will become rancid rather soon.

SUMMARY OF THE INVENTION

It is an object of the invention to limit the fat content of the final product in such a way that no additional energy is consumed.

In accordance with the present invention a process for frying thin potato slices to chips in which the slices are fried in a first stage in oil to a moisture content of 3-10% by weight, this product is removed from the oil and the moisture content is reduced in a second stage to 1.5-2.5% by the supply of heat, is characterized in, that for the reducing of the moisture content of the product in the second stage, the frying vapours formed above the oil in the first frying stage are used, said vapours, having a temperature of at least 120° C., are guided over the product so that substantially no false air is admitted.

The invention is based on the idea that vapours (steam, volatile components of the potatoes, oil vapour) liberated into the oil vessel may take up more water. By leading these vapours in the second stage over the product removed from the oil vessel, the moisture content of the chips may be reduced to the desired value (1.5-2.5%).

To obtain a good result, provisions must be made to admit as little false air as possible to at least that portion of the frying vapours which is lead to the chips removed from the oil vessel. This false air would decrease the temperature of the frying vapours and would cause oxidation of the oil.

The invention further relates to an apparatus for frying thin potato slices to so-called chips. This apparatus comprises an oil vessel, means to control the displacement of the slices from one end of the vessel to the opposite end, an inclined conveyor to remove the chips from the oil, a hood mounted above the oil vessel, at least one exhaust channel for the frying vapours and a drying device or chamber in which heat may be supplied to reduce the moisture content of the slices to the desired final value, wherein the drying device comprises at least one conveyor provided with openings or perforations, said conveyor dividing said drying device or chamber into an upper space and a lower space, the space at one side of said conveyor being in connection with a flowing channel for at least a portion of the frying vapours formed above the oil vessel whilst the space at the other side of the conveyor is in connection with an exhaust channel for said vapours.

DESCRIPTION OF THE INVENTION

By way of example the invention will now be elucidated with the aid of five drawings each giving a schematic representation of another embodiment.

The apparatus illustrated in the drawings are meant for frying thin potato slices to chips. Provisions have been made to reduce the oil content of the chips without increasing the power consumption.

Each of the apparatus comprises an oblong or longitudinal vessel 1, conveyor means (not indicated in the drawings but known per se) to control the displacement of the slices from the supply end (lefthand side in the figure) to the discharge end (righthand in the figure) of the oil vessel, an inclined conveyor 2 to remove the chips from the oil, a hood 3 mounted above the oil vessel and a drying device or chamber 4 forward of the inclined conveyor 2.

Further the apparatus comprise at least one exhaust channel or conduit for the frying vapours. In all the embodiments there is a connection between the oil vessel and the drying device or chamber by means of which at least a portion of the frying vapours may be lead from the oil vessel to the drying device.

In the embodiments according to FIGS. 1 and 2 the exhaust channel or conduit for the frying vapours is indicated at 5 whilst the connecting conduit between the drying device or chamber and the space above the oil vessel is indicated at 6.

One end of the pipe 6 protrudes through hood 3 and ends into a collecting hood 7 of which the boarder or peripheral edge is dipped into the oil or extends not more than 5 centimeters above the oil level.

The drying device 4 comprises a vessel 8 and one or more conveyors 9 provided with openings or perforations. Further it has an exhaust for the frying vapours which have past the product.

In the embodiments according to FIG. 1 pipe 6 debouches into the drying device below the conveyor 9 whilst the exhaust for the frying vapours is formed by a connection with the main exhaust channel 5, said connection being indicated with arrows.

In the embodiment according to FIG. 2 the place of debouchment of the pipe 6 is above the conveyors 9, whilst the frying vapours leave the drying device 4 through a separate exhaust channel or conduit 10 of which the inlet end lies below the conveyors 9.

In both embodiments a fan 11 is mounted in pipe 6 to overcome the resistance encountered by the frying vapours when passing the product on the conveyors 9.

The moisture content of the potato slices is reduced in the oil vessel to a value between 3 and 10%, preferably between 4 and 7%. In the drying device 4 the moisture content is reduced to a value between 1.5 and 2.5% by weight. Essential for the invention is that the frying vapours formed above the oil in the oil vessel 1 are used as a drying medium in the drying device 4. These vapours having a temperature higher than 120° C., are able to take up more water. It is an advantage that the oil adhering to the slices cannot penetrate into the pores of the chips since the moisture is still evaporating through the pores.

It is important that in that portion of the frying vapours that is led to the drying device, substantially no false air may penetrate. Such air would lead to a cooling down of the vapours and to oxidation of the oil. In the embodiments according to FIGS. 1 and 2 the collecting hood 7 has to be dipped with its lower end into the oil or has to be placed a very short distance above the oil. Further the distance a between the supply end for the product to be fried and the ends of the collecting hood 7 turned towards that end has to be at least 5% of the total length of the oil vessel. In that case it is avoided that air may flow from the product supply end directly under the collecting hood 7.

It appeared that for the drying in the drying device sufficient frying vapours may be collected if the area along which the collecting hood 7 extends, lies between 25 and 50% of the total surface of the oil.

The collecting hood 7 may be omitted if one cares in another way that air cannot penetrate into that portion of the frying vapours destined for the drying device 4.

FIG. 3 illustrates that at the beginning and at the end of the oil vessel 1 an exhaust channel 12, 13 respectively is mounted in which entering air may be exhausted before it may penetrate into the hood 3. The desired portion of the frying vapours is led through pipe 6 (without hood 7) to the drying device 4 which has about the same construction as in the embodiment according to FIG. 2.

FIG. 4 illustrates an embodiment in which the exhaust channel or conduit 12 is mounted at the beginning of the oil vessel and the exhaust channel or conduit 14 is mounted at the discharge end of the drying device 4. The hood 3 extends over the oil vessel 1 as well as over the drying device 4. No air is admitted under the hood 3.

A big portion of the drying vapours of the oil vessel 1 flows to the drying device 4 where a portion is removed through exhaust channel or conduit 14 and another portion is passed through the product lying on the conveyors 9 after which that portion of the frying vapours arrives into the exhaust channel or conduit 15 of which the lower end debouches below the conveyors 9.

A fan 16 is mounted in the discharge channel to overcome the resistance encountered by the vapours when penetrating the product.

In the embodiment according to FIG. 5 the frying apparatus for carrying out the first stage and the drying apparatus for carrying out the second stage are mounted in the same vessel 1. An inclined conveyor 17 such as an endless chain having depending buckets is mounted between the conveyors 9 of the drying device and the inclined conveyor 2. The apparatus comprises two exhaust channels or conduits 12, 18 only. A substantial portion of the frying vapours will arrive into the drying device forced by the fan 19, mounted in channel 18, through the product on the conveyors 9.

The end product leaves the apparatus on the transverse conveyor 20. A branch of channel or conduit 18 may debouch at the place where the transverse conveyor 20 protrudes through the wall of the apparatus to prevent that false air flows into the drying device.

I claim:

1. An apparatus suitable for frying a product comprising thin potato slices and forming chips thereof which comprises,
    a first frying means including an oil vessel for at least partially frying and displacing said product from one end of the vessel to its opposite end,
    a hood extending over the oil vessel including a first exhaust and conduit means for collecting heated frying vapors from said oil vessel,
    a second frying means comprising a drying chamber cooperatively associated with the opposite end of said first frying means by means of a conveyor for transporting said product from said oil vessel to said drying chamber for removing moisture therefrom,
    perforated conveyor means within said drying chamber for receiving and supporting said product for the drying thereof,
        said conveyor means dividing said drying chamber into an upper space and a lower space, and
    a second exhaust and conduit means associated with said oil vessel and said drying chamber for bypassing at least a portion of said heated frying vapors from said oil vessel into a space on one side of said perforated conveyor means to cause said heated frying vapors to flow through the product-laden perforated conveyor to the other space of said drying chamber and out and thereby reduce moisture in said product.

2. The apparatus of claim 1, wherein said second exhaust and conduit means includes a separate pipe debouching at the oil vessel into a collecting hood with the peripheral edge of said hood disposed just above the oil in said oil vessel.

3. The apparatus of claim 2, wherein a fan is mounted in said separate pipe to overcome resistance of the flow of frying vapor passing through the product-laden perforated conveyor in said drying chamber.

* * * * *